United States Patent
Parsons

(10) Patent No.: US 10,545,057 B2
(45) Date of Patent: Jan. 28, 2020

(54) AIR TEMPERATURE SENSOR AND METHOD OF REDUCING ERROR

(71) Applicant: Unison Industries, LLC, Jacksonville, FL (US)

(72) Inventor: John Patrick Parsons, Afton, NY (US)

(73) Assignee: Unison Industries, LLC, Jacksonville, FL (US)

( * ) Notice: Subject to any disclaimer, the term of this patent is extended or adjusted under 35 U.S.C. 154(b) by 203 days.

(21) Appl. No.: 15/630,405

(22) Filed: Jun. 22, 2017

(65) Prior Publication Data

US 2018/0372558 A1 Dec. 27, 2018

(51) Int. Cl.
*G01K 13/02* (2006.01)
*G01K 1/20* (2006.01)

(52) U.S. Cl.
CPC ............ *G01K 13/028* (2013.01); *G01K 1/20* (2013.01); *G01K 2013/024* (2013.01)

(58) Field of Classification Search
CPC ... G01K 13/028; G01K 1/20; G01K 2013/024
See application file for complete search history.

(56) References Cited

U.S. PATENT DOCUMENTS

| | | |
|---|---|---|
| 4,142,824 A | 3/1979 | Andersen |
| 5,476,364 A | 12/1995 | Kildea |
| 5,733,102 A | 3/1998 | Lee et al. |
| RE36,215 E | 6/1999 | Rosenthal |
| 6,267,328 B1 | 7/2001 | Vest |
| 6,443,395 B1 | 9/2002 | Porte et al. |
| 6,543,298 B2 * | 4/2003 | Cronin .................. B64D 43/02 374/E13.006 |
| 6,609,825 B2 | 8/2003 | Ice et al. |
| 6,941,805 B2 | 9/2005 | Seidel et al. |
| 6,971,851 B2 | 12/2005 | Liang |
| 7,118,342 B2 | 10/2006 | Lee et al. |
| 7,156,552 B2 | 2/2007 | Fleming |
| 7,174,782 B2 | 2/2007 | Ice |
| 7,313,963 B2 | 1/2008 | Kuznar |
| 7,328,623 B2 | 2/2008 | Slagle et al. |
| 7,357,572 B2 | 4/2008 | Benning et al. |
| 7,441,948 B2 | 10/2008 | Bernard et al. |
| 7,674,036 B2 | 3/2010 | Severson |
| 7,845,222 B1 | 12/2010 | Goedel et al. |
| 7,854,548 B2 | 12/2010 | Sandnas et al. |
| 8,100,582 B1 | 1/2012 | Powell |
| 8,157,440 B2 | 4/2012 | Kulczyk |
| 8,172,507 B2 | 5/2012 | Liang |
| 8,517,604 B2 | 8/2013 | Parsons |
| 9,085,988 B2 | 7/2015 | Kwon et al. |
| 9,488,534 B2 | 11/2016 | Wigen et al. |
| 9,494,050 B2 | 11/2016 | Schnoebelen et al. |
| 9,631,985 B2 | 4/2017 | Herman |

(Continued)

FOREIGN PATENT DOCUMENTS

CA 2449335 1/2008

*Primary Examiner* — Lisa M Caputo
*Assistant Examiner* — Philip L Cotey
(74) *Attorney, Agent, or Firm* — McGarry Bair PC

(57) ABSTRACT

A total air temperature sensor can include a first airfoil having a heated first surface, a second airfoil having a second surface spaced from the first surface and defining a sensor chamber, a temperature sensor located within the chamber, and a sheath surrounding the temperature sensor.

22 Claims, 7 Drawing Sheets

100

(56) References Cited

U.S. PATENT DOCUMENTS

| | | | |
|---|---|---|---|
| 2003/0010109 A1* | 1/2003 | Cronin | B64D 43/02 |
| | | | 73/170.12 |
| 2010/0176243 A1 | 7/2010 | Nieman et al. | |
| 2012/0285261 A1* | 11/2012 | Goedel | G01K 13/028 |
| | | | 73/861.42 |
| 2013/0163636 A1* | 6/2013 | Parsons | G01K 13/028 |
| | | | 374/158 |
| 2013/0315283 A1* | 11/2013 | Parsons | G01K 1/16 |
| | | | 374/208 |
| 2014/0064330 A1* | 3/2014 | Agami | G01K 13/028 |
| | | | 374/138 |
| 2014/0178207 A1 | 6/2014 | He et al. | |
| 2015/0063414 A1* | 3/2015 | Wigen | G01K 13/028 |
| | | | 374/138 |
| 2015/0093244 A1* | 4/2015 | Wigen | G01K 13/028 |
| | | | 416/61 |
| 2016/0032757 A1 | 2/2016 | Liu et al. | |
| 2016/0153284 A1 | 6/2016 | Kwon et al. | |
| 2017/0058772 A1 | 3/2017 | Frank et al. | |

\* cited by examiner

AIR TEMPERATURE SENSOR AND METHOD OF REDUCING ERROR

BACKGROUND OF THE INVENTION

Turbine engines, and particularly gas or combustion turbine engines, are rotary engines that extract energy from a flow of combusted gases passing through the engine onto a multitude of rotating turbine blades. Gas turbine engines have been used for land and nautical locomotion and power generation, but are most commonly used for aeronautical applications such as airplanes or helicopters. In airplanes, gas turbine engines are used for propulsion of the aircraft.

During operation of a turbine engine, the air temperature (can be measured by a specially designed total air (TAT) temperature probe mounted on the surface of the aircraft or the interior walls of the turbine engine. The TAT probe is designed to reduce the velocity of the air to rest relative to the aircraft, thus consistently sensing air temperature between total and static temperature. TAT is an important input for calculating static air temperature and true airspeed.

Because TAT sensors are often mounted in front of the turbine engine or in front of the compressor, they can be exposed to adverse conditions including high Mach numbers and icing conditions, as well as water and debris. The primary function of the TAT sensor is to sense the air temperature and filter out water, debris and any ice that may reach the sensor.

BRIEF DESCRIPTION OF THE INVENTION

In one aspect, a total air temperature sensor includes a first airfoil having a heated first surface, a second airfoil having a second surface spaced from the first surface and defining a sensor chamber with a mouth between the first and second surfaces, a temperature sensor located within the chamber downstream of the mouth, and a sheath surrounding the temperature sensor and having an inlet and an outlet, where the sheath can be spaced from the first surface to define a channel between the first surface and the sheath, and wherein the inlet, first surface and second surface are configured such that heated air flow along the first surface is directed into the channel and un-heated ambient air flows through the mouth and into the inlet.

In another aspect, a total air temperature sensor includes an asymmetrical first airfoil having a heated first surface with a convex portion and a concave portion, which is downstream of the convex portion, and a first trailing edge adjacent the concave portion, a second airfoil having a second surface spaced from the first surface to define a sensor chamber with a mouth between the first and second surfaces, a temperature sensor located within the chamber downstream of the mouth, and a sheath surrounding the temperature sensor and having an inlet and an outlet, where the sheath can be spaced from the first surface to define a channel between and the sheath and the first surface along the concave portion.

In yet another aspect, a method for reducing a temperature-induced error in a total air temperature sensor that includes at least one heated airfoil with a temperature sensor located down stream of at least a portion of the at least one heated airfoil to define a flow channel therebetween, where the method includes constraining a boundary layer of heated air along the at least one heated airfoil such that the boundary layer passes through the flow channel without impacting the temperature sensor.

DESCRIPTION OF EMBODIMENTS OF THE INVENTION

Figure 1:
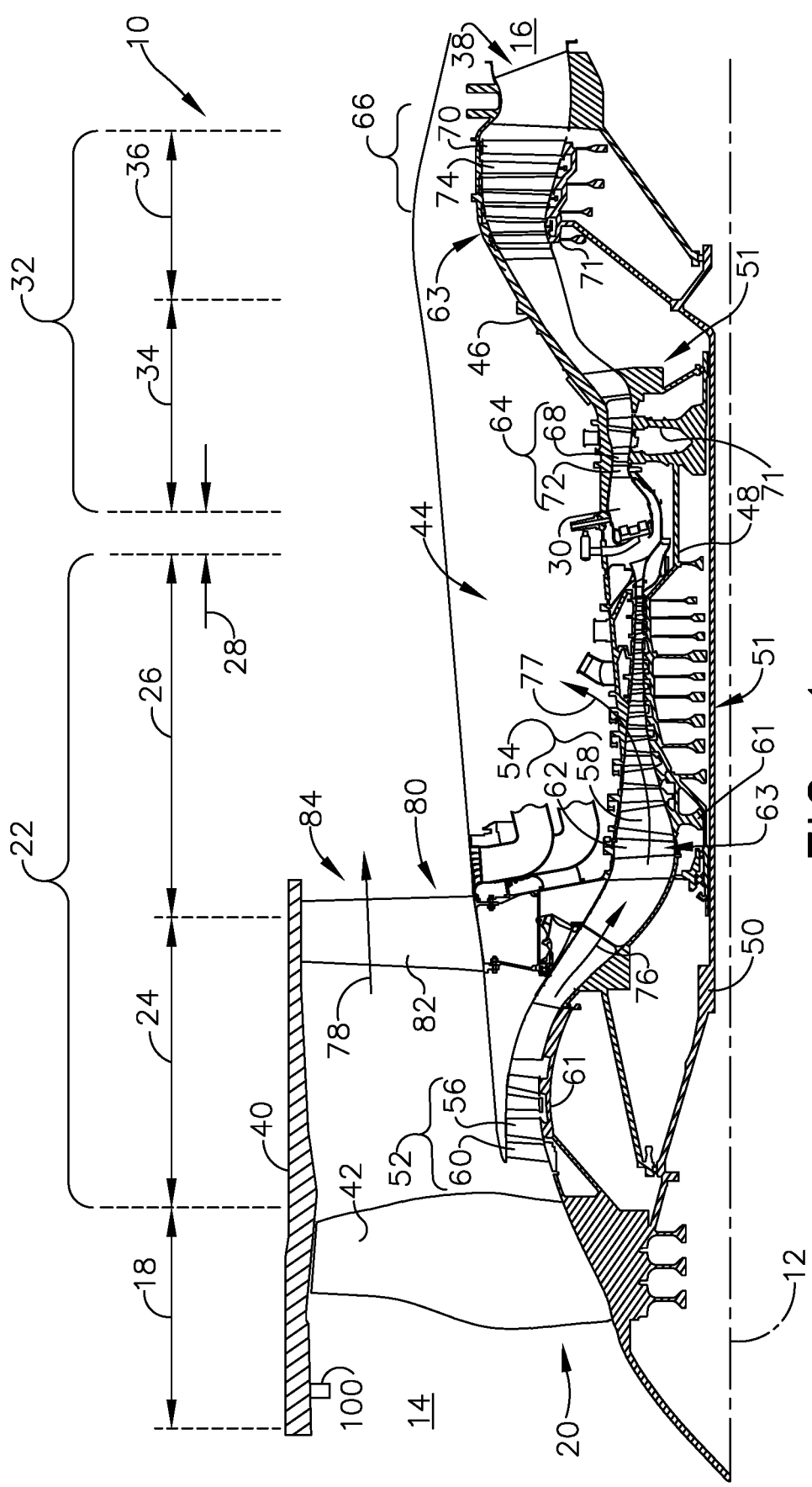
FIG. 1 is a schematic cross-sectional diagram of a gas turbine engine for an aircraft including a total air temperature sensor.

The described embodiments of the present disclosure are directed to a temperature sensor for an aircraft turbine engine. It will be understood, however, that the disclosure is not so limited and may have general applicability within an engine, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40. A total air temperature (TAT) sensor 100 can be disposed in the fan casing 40 as shown; however, this example is not meant to be limiting and the TAT sensor 100 may be positioned in other locations in the turbine engine 10.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
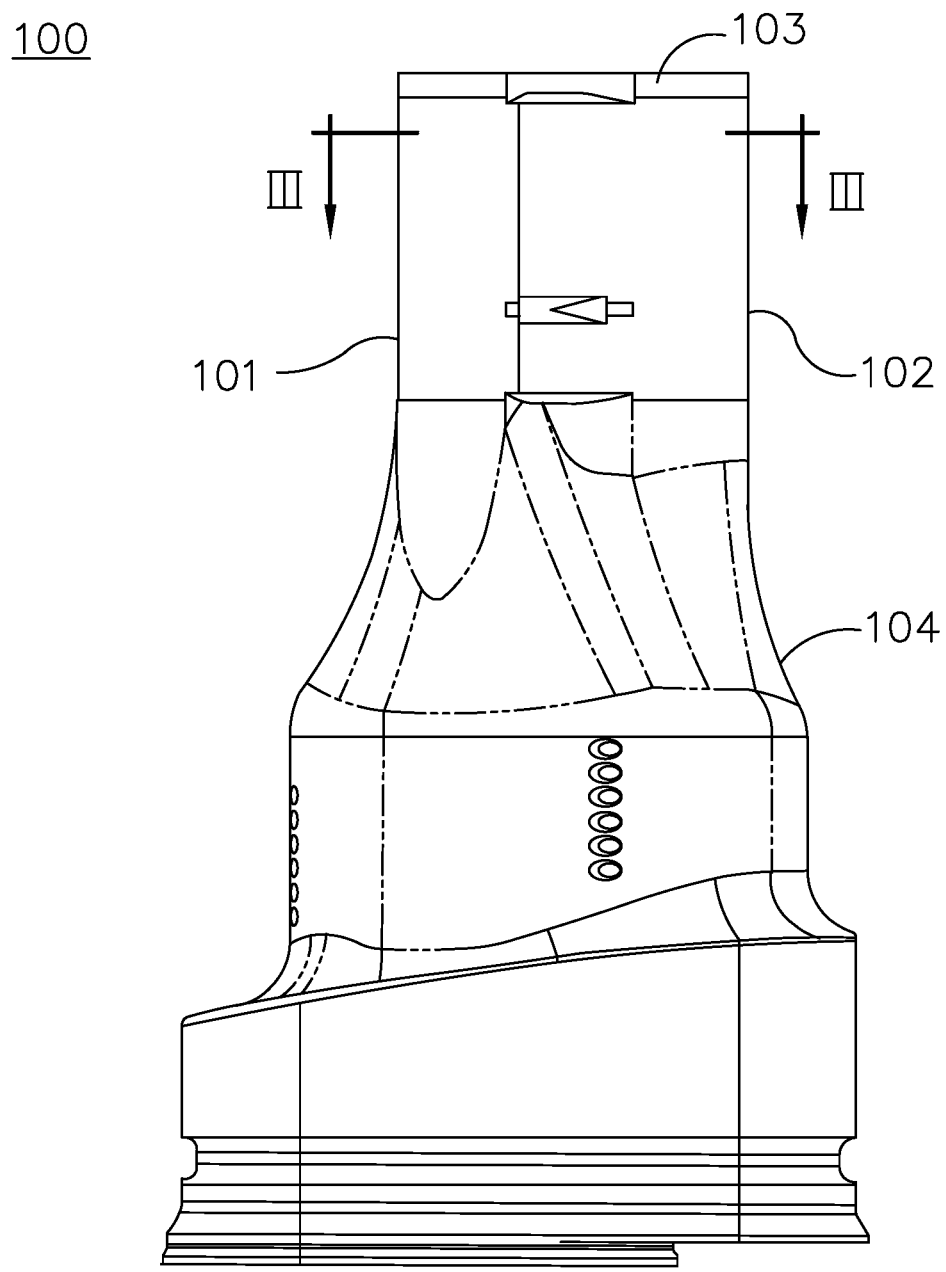
FIG. 2 is a side view illustrating the total air temperature of FIG. 1.

Turning to FIG. 2, the TAT sensor 100 is illustrated comprising a fore edge 101 and an aft edge 102. The TAT sensor 100 may also include a cover plate 103 as shown, and can be mounted to a suitable housing 104 for attachment to the turbine engine 10.

Figure 3:
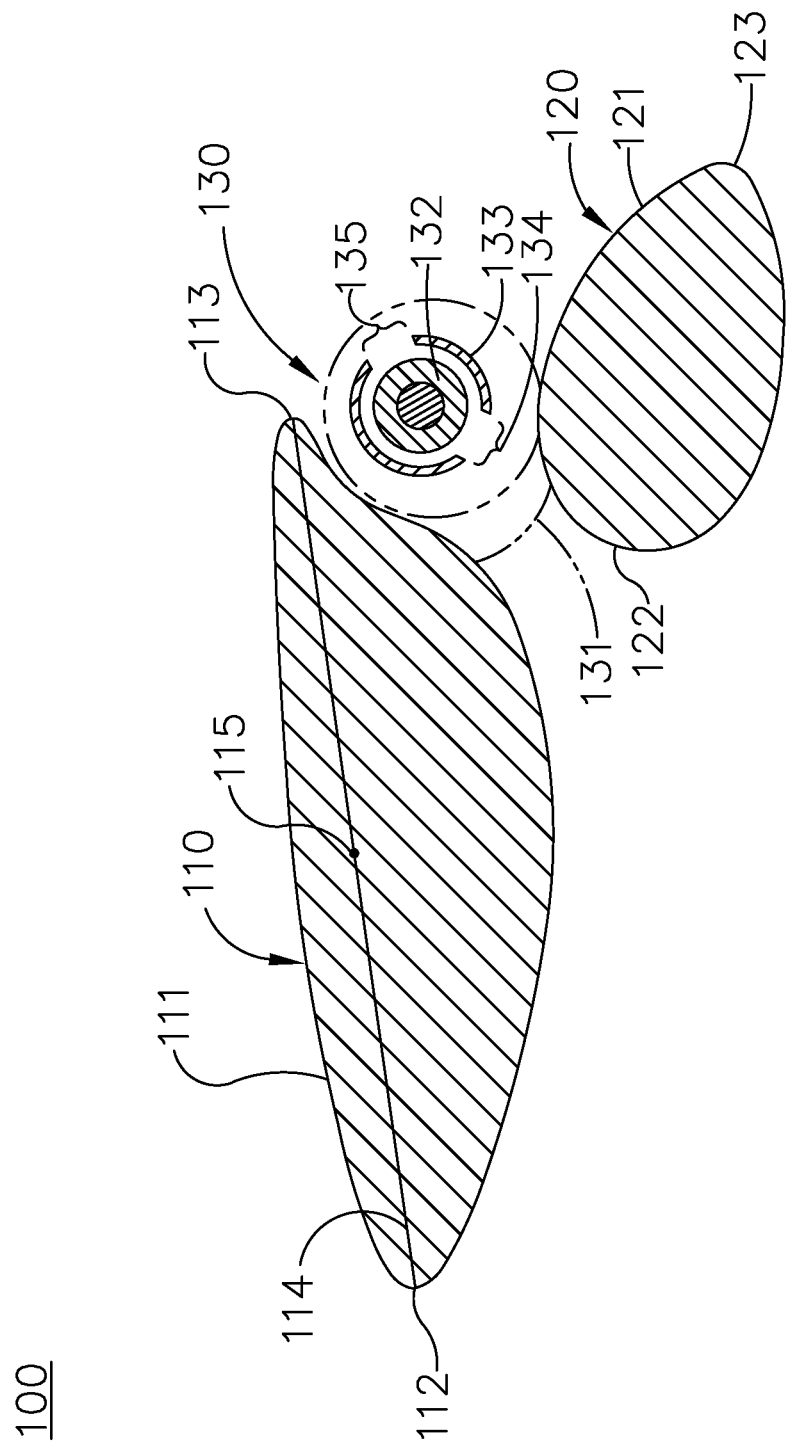
FIG. 3 is a cross-sectional view of the total air temperature sensor taken along of FIG. 2.

In FIG. 3, the total air temperature (TAT) sensor 100 is illustrated including a first airfoil 110, second airfoil 120, and sensor chamber 130. The first airfoil 110 can include a first surface 111 which can be asymmetric, a first leading edge 112, a first trailing edge 113, and a first chord length 114 with a first mid-chord point 115 as shown. The second airfoil 120 can include a second surface 121 which can be symmetric or asymmetric, a second leading edge 122, and a second trailing edge 123. When arranged, the second leading edge 122 can be positioned downstream of the first mid-chord point 115 and upstream of the first trailing edge 113 as shown; in a non-limiting example the second leading edge 122 can be spaced upstream of the first trailing edge 113 by up to 10% of the first chord length 114. The sensor chamber 130 can include a mouth 131, a temperature sensor 132, and a sheath 133 that can at least partially surrounds the temperature sensor 132; the sheath 133 can also include an inlet 134 and outlet 135 where the inlet 134 can be positioned downstream of the second leading edge 122.

Figure 4:
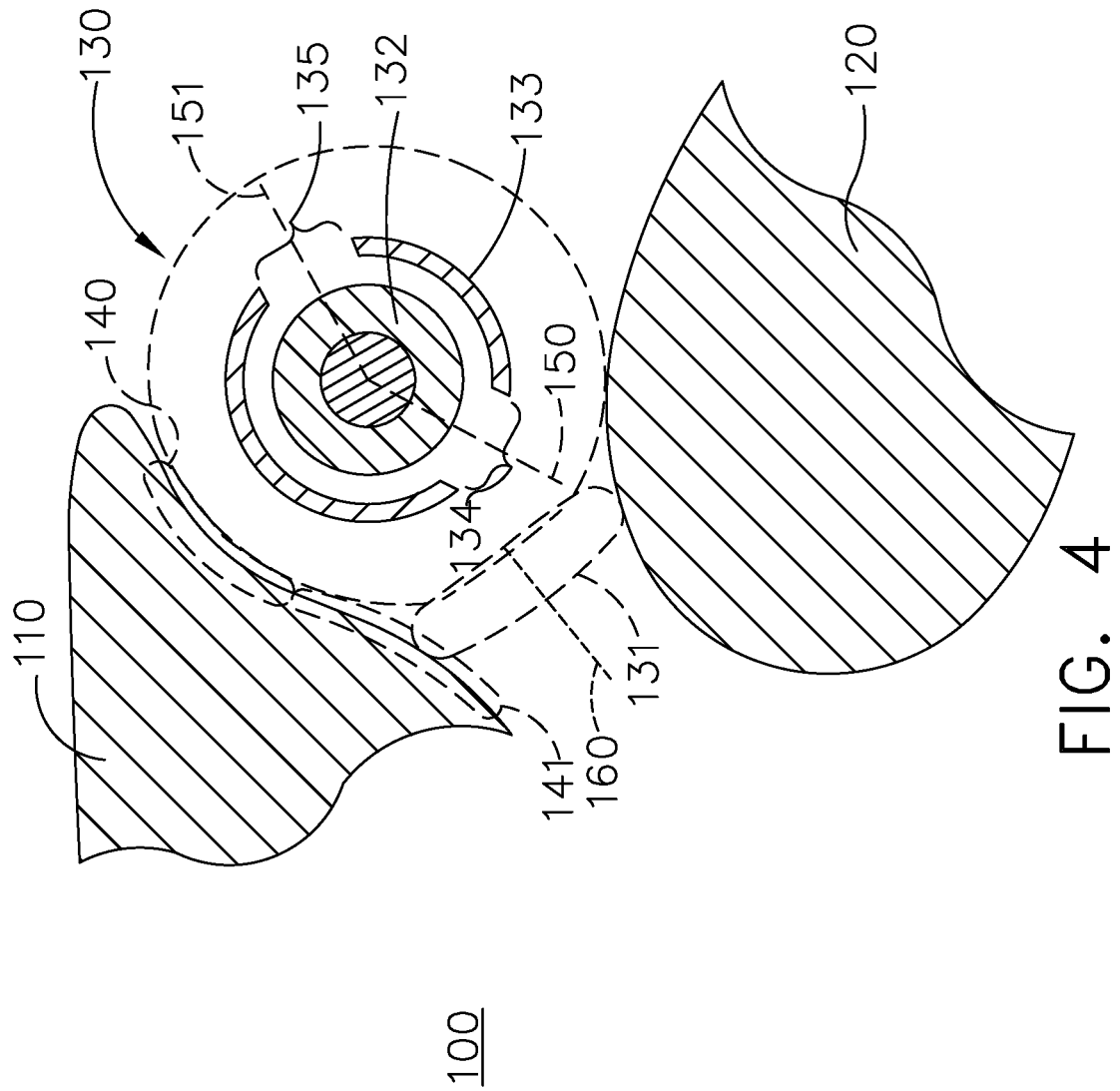
FIG. 4 illustrates an enlarged portion of the total air temperature sensor of FIG. 3.

A region near the sensor chamber 130 can be seen in further detail in FIG. 4. The first surface 111 of the first airfoil 110 can include a concave portion 140 adjacent the first trailing edge 113 and sheath 133, as well as a convex portion 141 upstream of the concave portion 140 and adjacent the mouth 131; the concave portion 140 can have a complementary geometric profile to the sheath 133 confronting the portion 140 as shown. In addition, the inlet 134 can include an inlet centerline 150 while the outlet 135 can include an outlet centerline 151; it is contemplated that the inlet centerline 150 and outlet centerline 151 can be aligned in different directions as shown, or the centerlines 150, 151 can be parallel, in non-limiting options. The mouth 131 can also include a mouth flow center streamline 160, and it is contemplated that the mouth streamline 160 and inlet centerline 150 can also be aligned in different directions such that the mouth 131, inlet 134, and outlet 135 include centerlines that are not aligned with one another.

Figure 5:
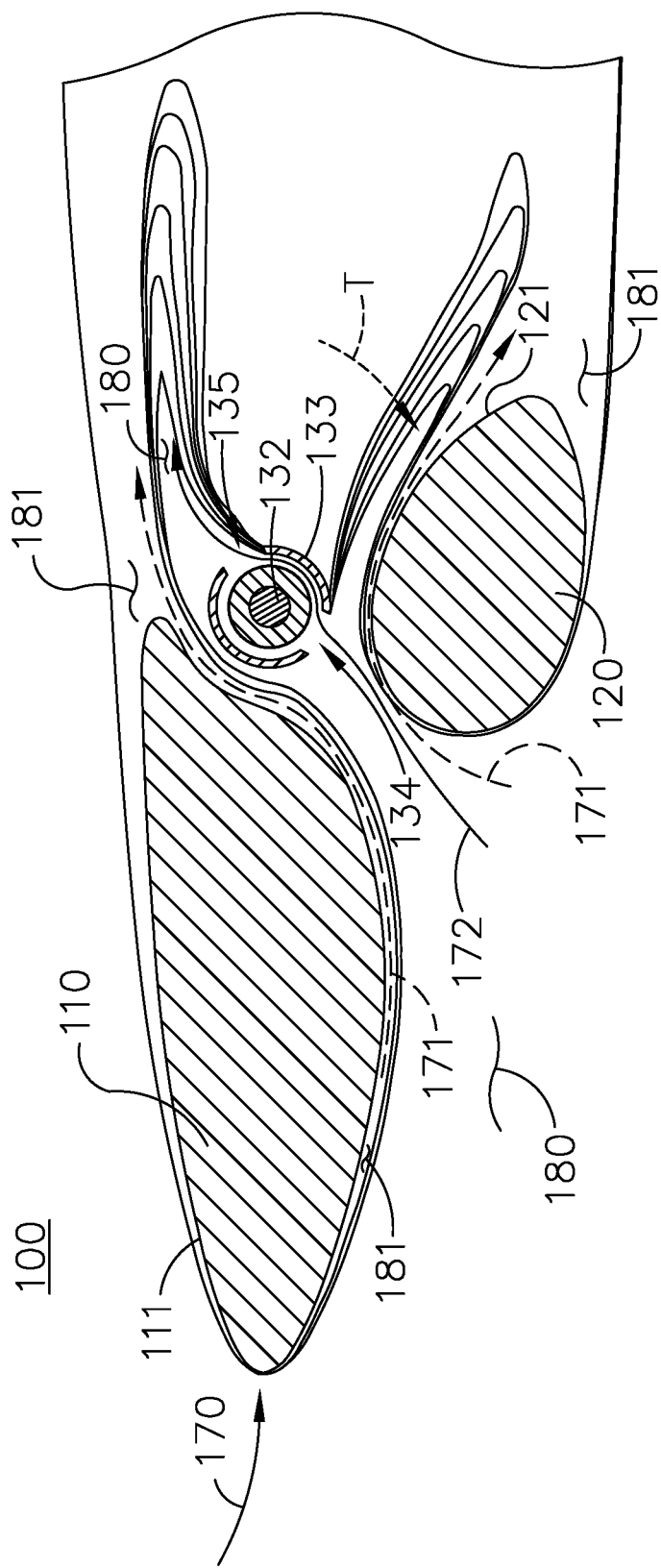
FIG. 5 illustrates the total air temperature sensor of FIG. 3 including air temperatures which are illustrated by contour lines representing temperature changes.

The relative positions of the first and second airfoils 110, 120 and sensor chamber 130 can direct incoming air flows (illustrated with an exemplary arrow 170) around and through the TAT sensor 100 as illustrated in FIG. 5. Either or both of the first and second surfaces 111, 121 can be heated to reduce ice accumulation; for the purposes of illustration both surfaces 111, 121 are shown to be heated throughout. The surfaces 111, 121 can generate heated air flows illustrated with dashed heated air flow arrows 171. An exemplary ambient air flow arrow 172 illustrates air that is not heated by surfaces 111, 121. In operation, heated air near the surfaces 111, 121 can flow through the mouth 131 and exit the sensor chamber 130 without flowing through the inlet 134 or outlet 135, while ambient air can flow through the mouth 131 and sensor chamber 130, passing through the inlet 134 to be measured by the temperature sensor 132 before passing through the outlet 135. In this manner the temperature sensor 132 can measure the ambient air temperature while heated air can be directed around the sheath 133 to avoid measurement errors.

As the first and second surfaces 111, 121 are heated, it can be appreciated that an ambient temperature region 180 can exist in regions sufficiently far from the first and second airfoils 110, 120, while a heated temperature region 181 can exist proximate the surfaces 111, 121 as shown; an arrow T indicates a direction of decreasing temperature from the heated region 181 toward the ambient region 180. In one example, the first and second surfaces 111, 121 were heated to 700° F., the resulting heated temperature region 181 was 200° F., and the ambient temperature region 180 was 70° F. As air flows through the TAT sensor 100, the heated temperature region 181 can be limited to the space outside of the sheath 133 while the ambient temperature region 180 can extend within the sheath 133, inlet 134, and outlet 135. Thus the temperature sensor 132 can accurately measure the ambient air temperature, as the heated temperature region 181 can be limited to regions proximate the first and second surfaces 111, 121.

Figure 6:
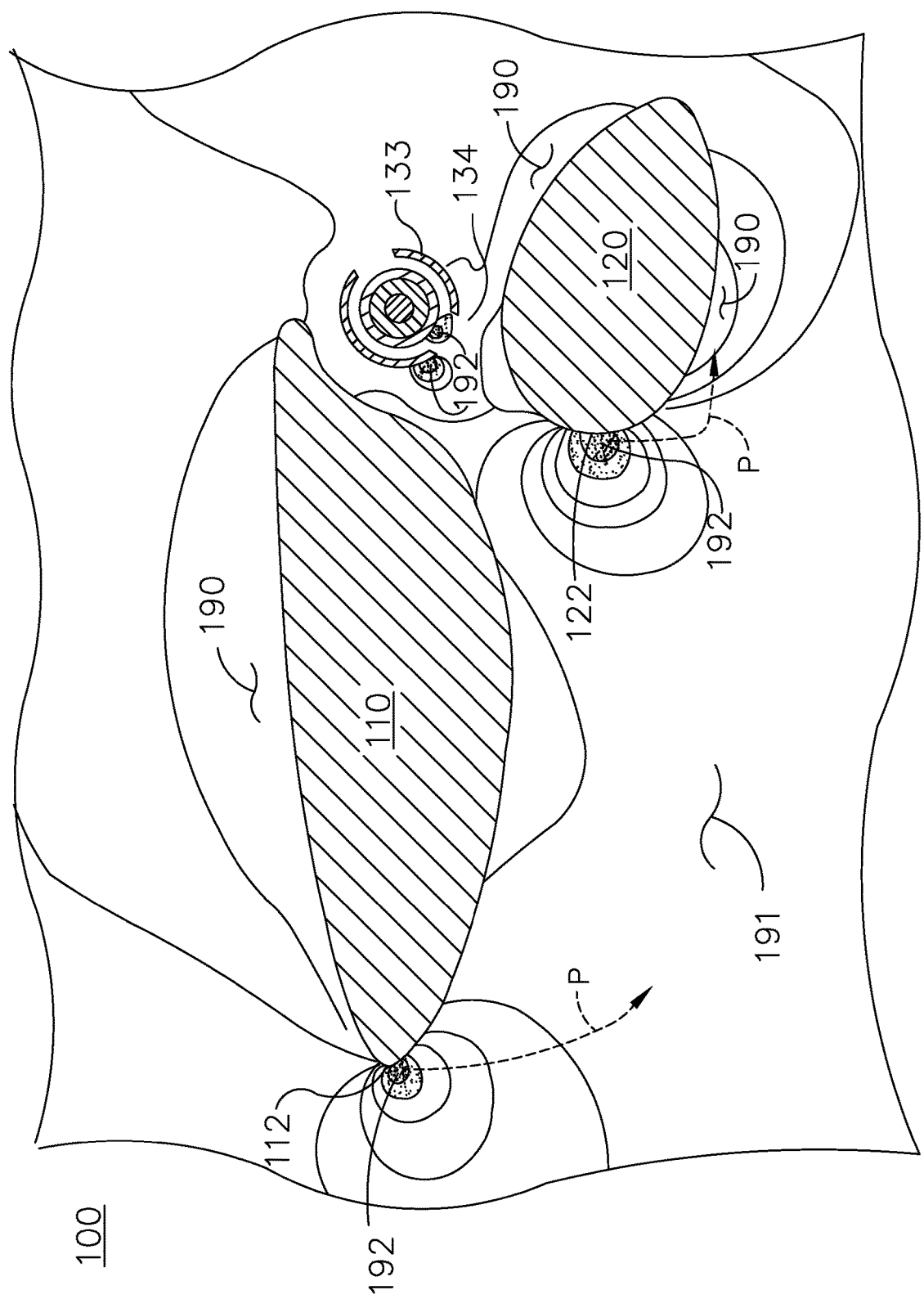
FIG. 6 illustrates the total air temperature sensor of FIG. 3 including regions of differing air pressures, which are illustrated by contour lines representing pressure changes.

The local air pressure can vary in and around the TAT sensor 100 as illustrated in FIG. 6. Regions of low pressure 190 can form along the first airfoil 110 downstream of the first leading edge 112, as well as along the second airfoil 120 downstream of the second leading edge 122 as shown. A region of air at ambient pressure 191 is illustrated for reference. In addition, regions of high pressure 192 can form at the first leading edge 112 and second leading edge 122, and the regions 192 can also form at the inlet 134 to the sheath 133. Arrows P indicate directions of decreasing pressure when moving from the high pressure regions 192 toward the low pressure regions 190.

Figure 7:
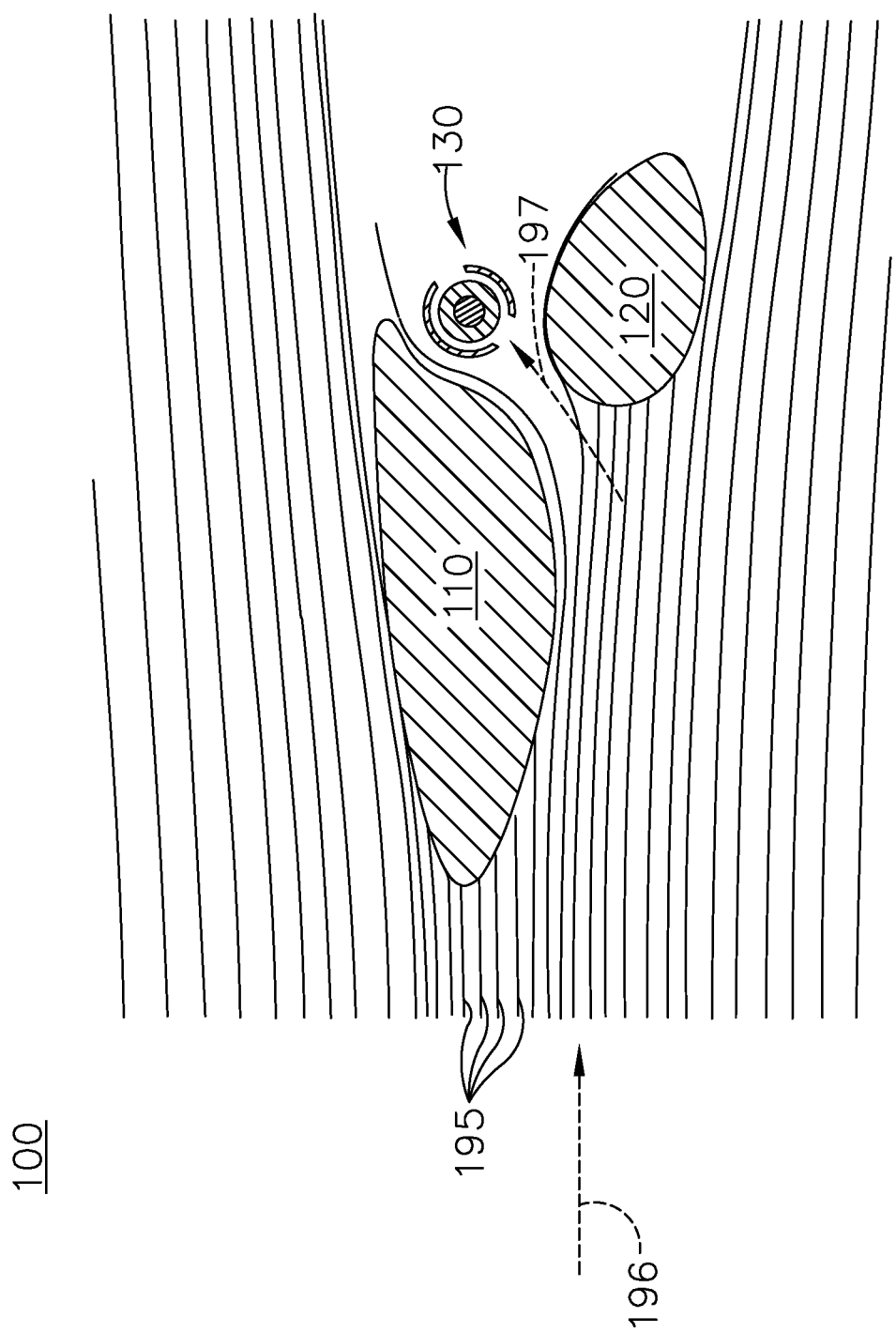
FIG. 7 illustrates the total air temperature sensor of FIG. 3 including water droplet paths surrounding the sensor.

Air flowing past the TAT sensor 100 can also contain water droplets moving along paths 195 as illustrated in FIG. 7. It can be seen that air flowing toward the TAT sensor 100 (illustrated with an arrow 196) is directed through a sharp turn in order to flow through the sensor chamber 130 (in a direction illustrated by arrow 197). As water droplets have a larger inertia than air, one effect of the disclosed arrangement of the airfoils 110, 120 and sensor chamber 130 is that water droplets can follow the droplet paths 195 to impinge the airfoils 110, 120 and be prevented from making the turn into the sensor chamber 130, while air is still able to flow into and through the sensor chamber 130. Thus, during operation the sensor chamber 130 can be protected from impingement by water droplets and other materials.

A method for reducing a temperature-induced error in the TAT sensor 100 can include constraining a boundary layer of heated air, such as the heated temperature region 181 (FIG. 5), along either or both of the heated airfoils 110, 120 such that the heated air flow 171 in the heated temperature region 181 can pass through a flow channel in the TAT sensor 100 (such as the mouth 131 and sensor chamber 130) without impacting the temperature sensor 132. By positioning the second airfoil 120 upstream of the temperature sensor 132 and spaced from the first airfoil 110, the high pressure region 192 (FIG. 6) upstream of the second airfoil 120 can constrain the heated temperature region 181 outside of the sheath 133 (FIG. 6). Additional thermal shielding of the temperature sensor 132 can be accomplished by directing the heated air flow 171 along the concave portion 140 of the first surface 111, whose profile conforms to a portion of the temperature sensor 132 as described above.

It can be appreciated that aspects described herein for the TAT sensor 100 can allow for the use of heated airfoil surfaces, reducing or eliminating ice accretion on the airfoils 110, 120 which can prevent sensor damage from liberated ice or water. Air flows 170 through the TAT sensor 100 can be managed such that temperature measurements by the sensor 132 inside the sheath 133 can be unaffected by heat generated from the first and second surfaces 111, 121. In addition, water droplets that may exist in the air flows 170 can be prevented from reaching the temperature sensor 132, allowing for improved accuracy of temperature measurements by the sensor 132 which is important for efficient operation of the turbine engine 10.

It should be understood that application of the disclosed design is not limited to turbine engines with fan and booster sections, but is applicable to turbojets and turboshaft engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A total air temperature sensor comprising:
a first airfoil extending between a first leading edge and a first trailing edge, the first airfoil having a heated first surface around the periphery of the first airfoil and including a concave surface portion terminating at the first trailing edge;

a second airfoil extending between a second leading edge and a second trailing edge, with the second leading edge located downstream of the first leading edge, and with the second airfoil having a second surface around the periphery of the second airfoil spaced from the first surface and defining a sensor chamber with a mouth between the first and second surfaces;

a temperature sensor located within the sensor chamber; and a sheath surrounding the temperature sensor and having an inlet and an outlet, the sheath spaced from the first surface to define a channel between the first surface and the sheath;

wherein the concave surface portion confronts and is parallel to an outer surface of the sheath at the channel; and wherein the inlet defines an inlet centerline that intersects the second airfoil.

2. The total air temperature sensor of claim 1 wherein the second surface is heated.

3. The total air temperature sensor of claim 1 wherein the first airfoil is an asymmetrical airfoil.

4. The total air temperature sensor of claim 3 wherein the second airfoil is a symmetrical airfoil.

5. The total air temperature sensor of claim 1 wherein the first airfoil has first chord length with a first mid-chord point and the second airfoil has a second leading edge, which located downstream of the first mid-chord point.

6. The total air temperature sensor of claim 5 wherein the first airfoil has a first trailing edge and the second leading edge is upstream of the first trailing edge.

7. The total air temperature sensor of claim 6 wherein the first trailing edge is spaced from the second leading edge no more than 10% of the first chord length.

8. The total air temperature sensor of claim 7 wherein the inlet is downstream of the second leading edge.

9. The total air temperature sensor of claim 1 wherein the mouth has a local flow center streamline which is non-aligned with the inlet.

10. The total air temperature sensor of claim 9 wherein the outlet comprises an outlet centerline that is unaligned with the inlet centerline.

11. The total air temperature sensor of claim 1 wherein the first surface has a convex portion and a concave portion, which is downstream of the convex portion, and the sheath is adjacent the concave portion.

12. The total air temperature sensor of claim 11 wherein the concave portion is adjacent a trailing edge of the first airfoil.

13. The total air temperature sensor of claim 1 wherein the mouth is located such that liquid in an ambient air flow cannot enter the mouth.

14. The total air temperature sensor of claim 1 wherein the outlet of the sheath is downstream of the first trailing edge and upstream of the second trailing edge.

15. A total air temperature sensor comprising:
a first airfoil having a heated surface;
a second airfoil spaced from the first airfoil;
a sensor chamber defined between the first and second airfoils and having a mouth;
a temperature sensor located within the sensor chamber;
a sheath spaced from the first airfoil, surrounding the temperature sensor, and having an inlet and an outlet;
a channel defined within the sensor chamber between the sheath and the first airfoil;
an ambient air flow path defined through the mouth, through the sensor chamber, and through the sheath from the inlet to the outlet, and configured to draw a volume of ambient air along the ambient air flow path;
a heated air flow path defined through the mouth and through the channel between the sheath and the first airfoil, and configured to draw a volume of heated air around the sheath; and
an inlet centerline defined at the inlet to the sheath and intersecting the second airfoil such that the inlet is configured to direct the volume of ambient air toward the temperature sensor for measurement, and is configured to direct the volume of heated air away from the temperature sensor.

16. The total air temperature sensor of claim 15 wherein the second airfoil further comprises a heated second surface, and wherein a second heated air flow path is defined through the mouth between the second surface and the sheath and configured to draw a second volume of heated air around the sheath.

17. The total air temperature sensor of claim 16 wherein the inlet centerline is further configured to direct the second volume of heated air away from the temperature sensor.

18. The total air temperature sensor of claim 15 wherein the mouth further comprises a sharp turn configured to prevent particles within one of the ambient air flow or the heated air flow from entering the mouth.

19. The total air temperature sensor of claim 15 wherein the first airfoil comprises a first trailing edge and the second airfoil comprises a second leading edge, with the inlet to the sheath positioned upstream of the first trailing edge and downstream of the second leading edge.

20. The total air temperature sensor of claim 15 further comprising a high pressure region at the inlet of the sheath and located between the heated air flow path and the ambient air flow path.

21. A total air temperature sensor comprising:
a first airfoil having a first leading edge and a first trailing edge;
a second airfoil spaced from the first airfoil and having a second leading edge and second trailing edge, with the second leading edge located upstream of the first trailing edge;
a temperature sensor located between the first and second airfoils; and
a sheath spaced from the first airfoil, surrounding the temperature sensor, and having an inlet and an outlet, with the inlet located downstream of the second leading edge and upstream of the first trailing edge;
wherein the inlet comprises an inlet centerline that intersects the second airfoil.

22. The total air temperature sensor of claim 21 wherein the first airfoil further comprises a concave surface portion confronting the sheath and terminating at the first trailing edge.

* * * * *